No. 727,939.  
Patented May 12, 1903.

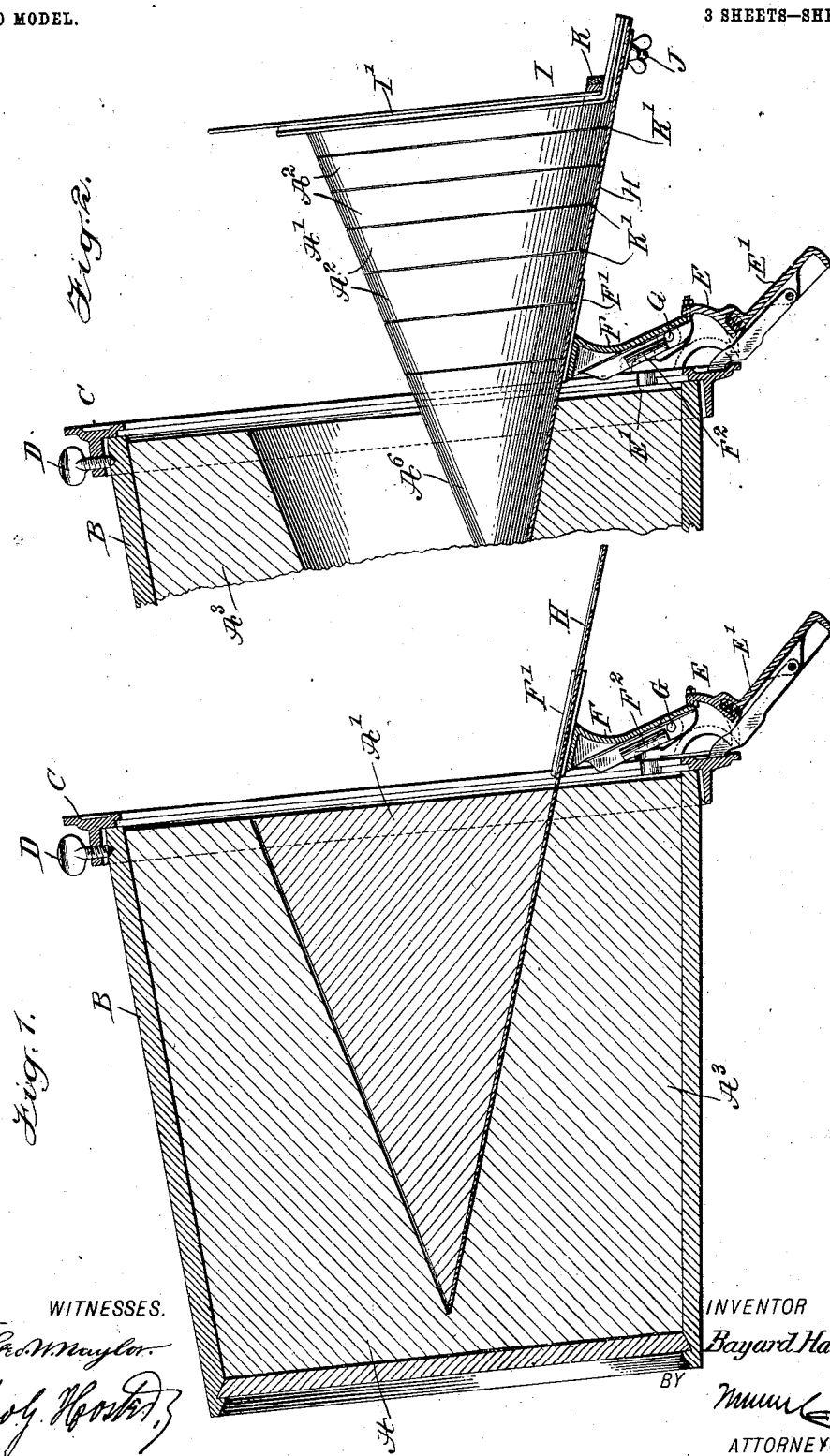

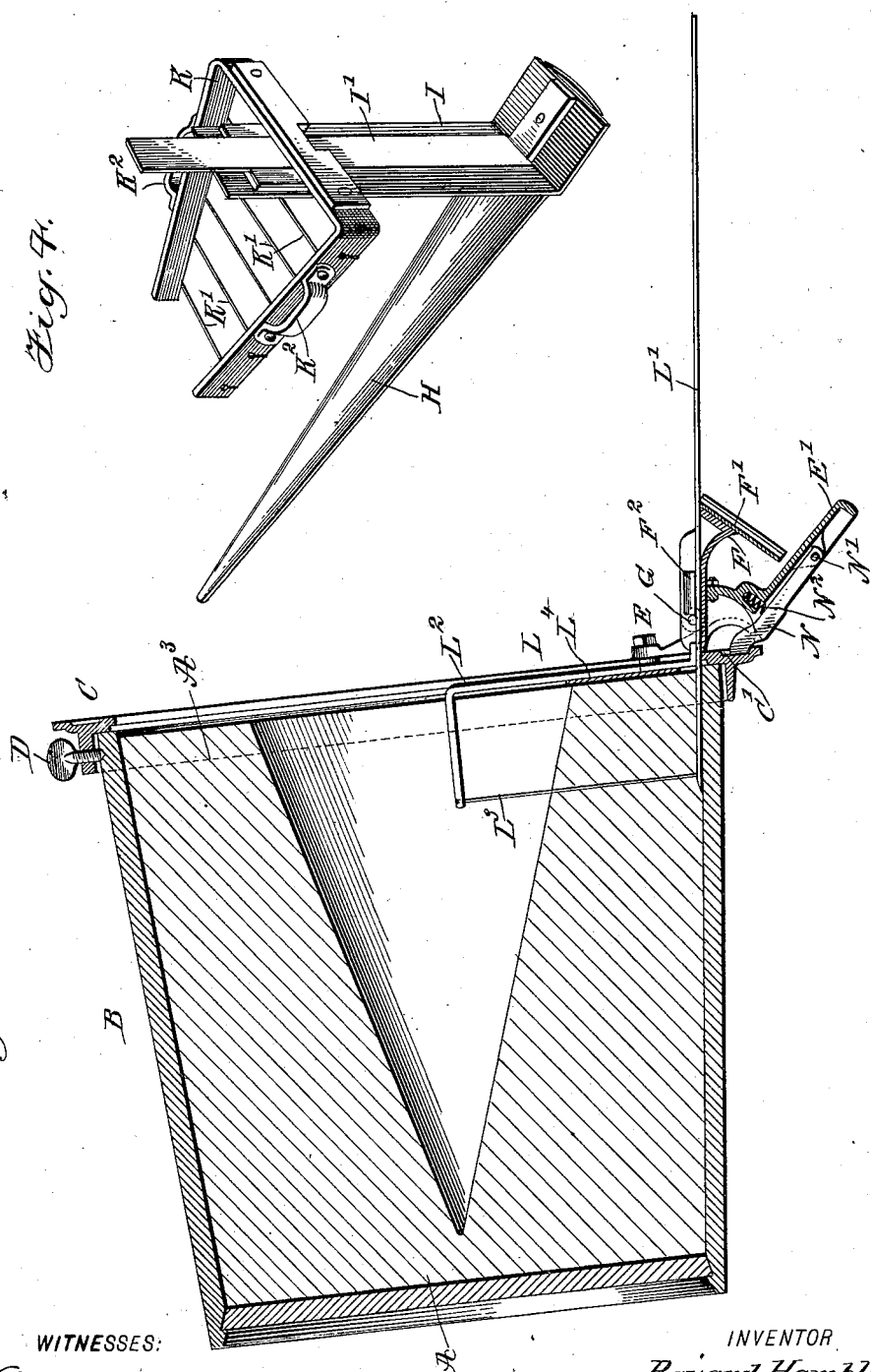

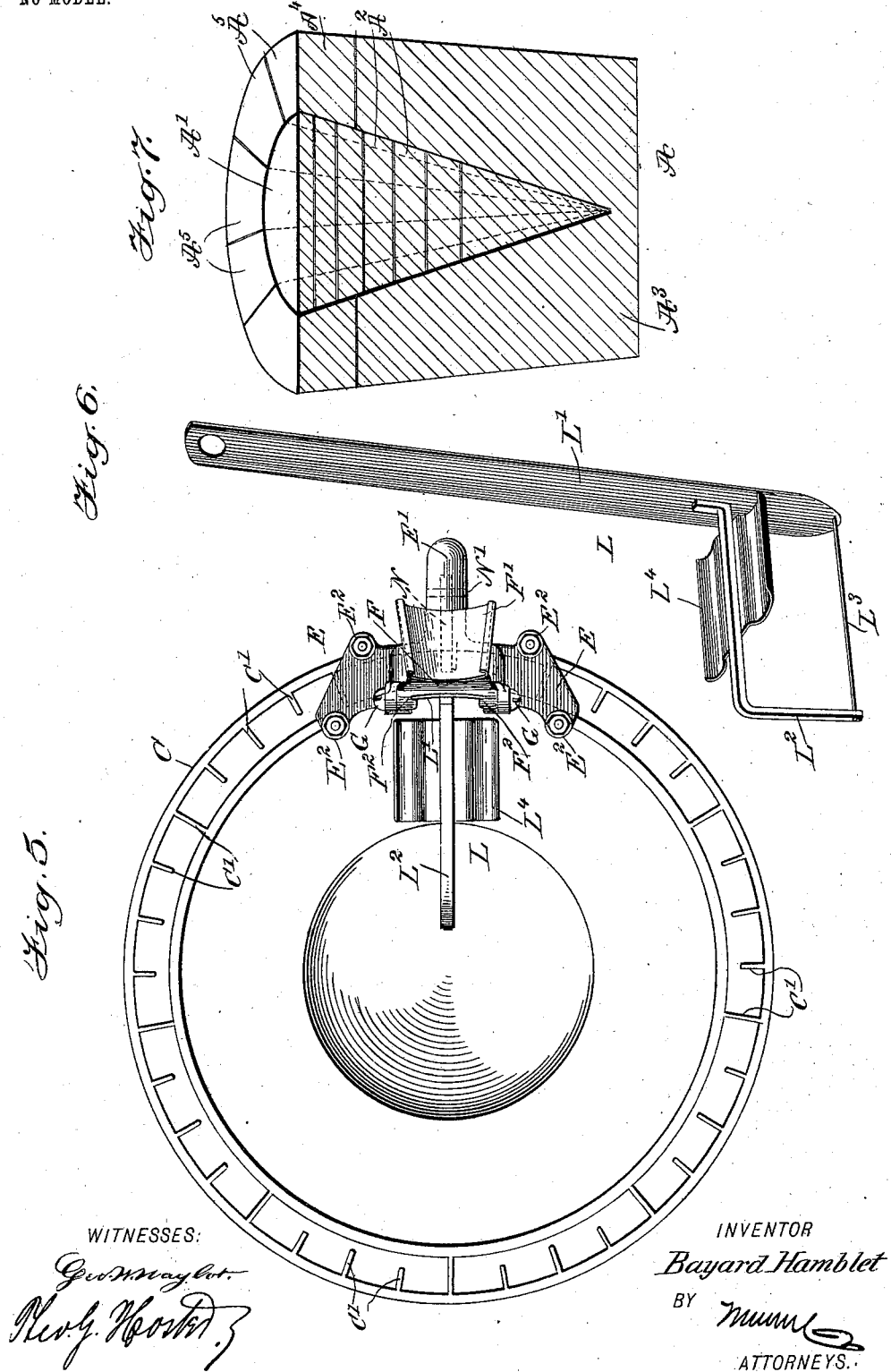

UNITED STATES PATENT OFFICE.

BAYARD HAMBLET, OF NEW YORK, N. Y., ASSIGNOR TO HIMSELF AND WILLIAM A. LIVINGSTON.

CUTTING DEVICE FOR BUTTER, LARD, &c.

SPECIFICATION forming part of Letters Patent No. 727,939, dated May 12, 1903.

Application filed September 27, 1902. Serial No. 125,088. (No model.)

*To all whom it may concern:*

Be it known that I, BAYARD HAMBLET, a citizen of the United States, and a resident of the city of New York, borough of Manhattan, in the county and State of New York, have invented a new and Improved Cutting Device for Butter, Lard, &c., of which the following is a full, clear, and exact description.

The invention relates to devices for cutting butter and similar products contained in tubs, firkins, and other receptacles.

The object of the invention is to provide a new and improved cutting device more especially designed for the use of grocers and other retail merchants selling butter and the like by the pound and arranged to enable the grocer to mechanically and accurately cut the product in the tub or like receptacle into parts of a predetermined weight without the use of scales or other weighing devices.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement as applied to a tub of butter for cutting out the cone-shaped center. Fig. 2 is a similar view of the same, showing the cut-out cone center partly removed from the tub and divided into parts of equal weight. Fig. 3 is a face view of the improvement, showing the device arranged for cutting rings from the material left in the tub after the cone-shaped center is removed. Fig. 4 is a perspective view of the means for cutting the cone-shaped center in parts of equal weight. Fig. 5 is a face view of the circular guideway and the carriage mounted to travel thereon. Fig. 6 is a perspective view of the cutting-tool for cutting the rings in the tub and for cutting the rings into parts of a desired weight; and Fig. 7 is a sectional perspective view of the material, showing the various cuts to be made by the cutting device.

In dividing the butter or other similar material A contained in a tub B of a predetermined size into parts of a predetermined weight by the apparatus hereinafter more fully described it is necessary to first cut a cone center $A'$ out of the material and remove it from the tub (see Fig. 2) and then divide this cone center by one device and at one operation into parts $A^2$ of equal weight, preferably one pound each. After this butter is disposed of to customers or wrapped up in single packages of one pound each then the material $A^3$ remaining in the tub is divided by a horizontal cut to form a ring $A^4$, which in turn is radially divided to form individual parts $A^5$ of a desired weight—say from one-half a pound to nine pounds. When the parts of the first ring have been disposed of, then from the remainder of the material $A^3$ in the tub is again cut a ring $A^4$, and the latter is divided radially, the same as the first ring $A^4$. This is repeated until all the material in the tub is disposed of.

It is understood that the material in the tub of a predetermined size is divided into a cone $A'$, which in size has such relation to the size of the remainder $A^3$ of the material in the tub that the above-described subdivisions produce parts of accurate weight, as stated. In an ordinary tub of butter, for instance, the base of the cone $A'$ is eight inches in diameter and the side of the cone thirteen and one-half inches, while the rings $A^4$ are two and one-half inches in thickness. I do not, however, limit myself to the measurements given, as the device may be readily constructed for use on different-sized tubs to produce equally good results.

The cutting device is provided with a circular or ring-shaped guideway C, adapted to be fastened by set-screws D to the open end of the tub B, as plainly indicated in Fig. 1, so as to hold the guideway C concentric with the base of the tub B. On this guideway C is mounted to travel a carriage E, supporting a carrier F, hung on a pivot G, connected with the carriage, to allow of swinging the carrier F inward into the position shown in Figs. 1 and 2 when cutting the cone center $A'$ or into the position shown in Figs. 3 and 5 when dividing the remainder, $A^3$, of the material in the tub into the rings $A^4$.

On the carrier F are formed two bearings or guideways F' F², of which the bearing F' has its members arranged obliquely to each other for receiving a cutting-tool H, having tapering sides and arranged to extend into the material A in the tub B to within about two inches of the bottom of the tub, as plainly indicated in Fig. 1. Now when this cutter H is inserted in the bearing F' and the operator takes hold of the handle E' of the carriage and moves the latter around on the circular guideway C then the said tool H cuts the material A to form the cone-center A'. After the carriage has made a complete revolution then the tool H is moved outward on the bearing F' to remove the cone A' from the remaining material A³, as illustrated in Fig. 2. The cone center A' now rests on the tool H, and the latter is now provided at its outer end with a dividing device for cutting the cone into the parallel parts A².

The dividing device referred to consists, essentially, of a bearing I, secured by a thumb-screw J to the outer end of the tool H, and on the vertical member of this bearing I is mounted to slide a ∪-shaped frame K, having transversely-extending cutting-wires K', spaced different distances apart one from the other, with the innermost wire K' a distance from the inner face of the bearing I. The frame K is provided at its sides with handles K², adapted to be taken hold of by the operator to move the frame and its cutting-wires K' down on the vertical member I' of the bearing I to cause the cutting-wires to cut the cone center A', as illustrated in Fig. 2. The apex portion of the cone center A' is used as a feed-piece A⁶ to supply any deficiency that may exist in the single pieces cut from the top of the material in the tub, it being understood that such deficiency sometimes results from irregular filling of the tub with the material or settling thereof during transportation. The feed-piece A⁶ is for the purpose described preferably of two-pound weight, it being understood that in order to accomplish this the outermost cutting-wire is omitted—that is, the frame K is provided with but six cutting-wires, as shown, instead of seven, which latter number is required for cutting the eight-pound cone into eight parts of one pound each.

The bearing F² is adapted to receive the blade L' of a cutting and dividing tool L, (see Figs. 3, 5, and 6,) the said tool having an L-shaped bracket L² secured at one end to the blade L', a cutting-wire L³, and a stop-plate L⁴. The cutting-wire is secured at one end to the blade L' and at the other end to the free end of the bracket L², and the stop-plate L⁴ is arranged above the cutting-wire and secured to the bracket, and the ends of the said plate L⁴ are turned up to allow the plate to ride over the face of the material A³ when cutting the latter into rings A⁴, as before mentioned.

When the carrier F is swung outward into the position shown in Figs. 3 and 5, then the blade L' of the tool L stands in alinement with the inner face of the tub B, and when the blade L' is pushed inward along its bearings F² then the wire L³ cuts the material radially until the stop-plate L⁴ abuts against the face of the material, as shown in Fig. 3. The operator now takes hold of the handle E' and moves the carriage once around on the guideway C to cause the wire L³ to cut the material into a ring A⁴ and bring the wire back to a radial cut. The blade L' is now moved outward for the wire to pass out of the radial cut.

Now in order to enable the operator to divide the ring A into parts of a desired weight the following arrangement is made: On the outer face of the circular guideway C are formed radially-extending stops C', (see Figs. 3 and 5,) adapted to be engaged by the free end of an arm N, fulcrumed at its outer end at N' within the hollow handle E', as plainly indicated in Fig. 3, and the said arm N is pressed in contact with the face of the guideway C by a spring N², likewise held on the handle E'. The stops C' are spaced equidistant apart and indicate quarter-pounds. Now when it is desired to form a part A⁵—say of one-quarter of a pound weight—then the operator takes hold of the handle E' and presses the arm N inward against the tension of the spring N² and then slides the carriage E on the guideway C until the released arm N abuts against the next following stop C'. The operator now holds the carriage in this position and pushes the blade L' inward, so that the wire L³ cuts a ring A⁴ radially a distance from the first radial cut, previously referred to, to form a part A⁵ of one-quarter of a pound weight. When it is desired to form a part A⁵ of one-half of a pound weight, then the carriage is shifted to the second stop C', for three-quarters of a pound three stops, and for four-quarters, or one, pound a distance of four stops, as will be readily understood by reference to Fig. 5. As indicated in the said Fig. 5, the guideway C is divided into nine pounds, with subdivisions of quarters of pounds, thus indicating that a ring A⁴ weighs nine pounds and can be subdivided into parts weighing one-quarter of a pound, one-half, three-quarters of one pound, up to nine pounds.

It is understood that the blade L' is of sufficient length to allow of sliding it inward in the guideway F² until each subsequent ring A⁴ is divided as required and removed from the tub, until the entire material A³ in the tub is disposed of to customers.

In order to allow of conveniently sliding the carriage E around on the guideway C, I prefer to provide the said carriage with friction-rollers E², traveling on the outer and inner edges of the circular guideway C.

It is expressly understood that the several parts of the device are so arranged relative one to the other as to coact in order to bring about the desired results—that is, to allow of cutting the material contained in the tub into parts of a predetermined weight without the use of scales.

Having thus described my invention, I claim as new and desire to secure by Letters Patent—

1. A cutting device for cutting butter and like material contained in a receptacle of the shape of a frustum of a cone into parts of predetermined weight, comprising means for cutting a cone center from the material in the receptacle, means for dividing the cone center into conical sections, of a predetermined weight, means for cutting the remainder of the material in the receptacle into rings, and means for cutting the rings radially to form parts of a desired predetermined weight, as set forth.

2. A cutting device for cutting butter and like material contained in a receptacle of the shape of a frustum of a cone into parts of predetermined weight, comprising a circular guideway for application to the open end of the receptacle, a carriage mounted to travel on the said guideway, and a cutting-blade on the said carriage, for cutting a cone-shaped center out of the material in the receptacle, as set forth.

3. A cutting device for cutting butter and like material contained in a receptacle of the shape of a frustum of a cone into parts of predetermined weight, comprising a circular guideway for application to the open end of the receptacle, a carriage mounted to travel on the said guideway, and a cutting-blade on the said carriage, for cutting a cone-shaped center out of the material in the receptacle, the said cutting blade being slidably held on the carriage, to allow of drawing the said cone-shaped center out of the tub by the said blade, as set forth.

4. A cutting device for cutting butter and like material in cone shape into parts of equal weight, comprising a support for the side of the cone material, a bearing on the said support, extending parallel to the base of the cone, and a divider slidable on the bearing and having spaced dividing-wires parallel to the bearing, to cut the cone in parallel sections of like weight, as set forth.

5. A cutting device for cutting butter and like material contained in a receptacle of the shape of the frustum of a cone into parts of a predetermined weight, comprising a circular guideway adapted to be secured to the open end of the receptacle, a carriage mounted to travel on the said guideway, and a cutter on the said carriage, traveling with the same, for cutting the material into parallel rings, as set forth.

6. A cutting device for cutting butter and like material contained in a receptacle of the shape of the frustum of a cone into parts of a predetermined weight, comprising a circular guideway adapted to be secured to the open end of the receptacle, a carriage mounted to travel on the said guideway, and a cutter on the said carriage, traveling with the same, for cutting the material into parallel rings, the cutter consisting of a blade slidable in bearings on the carriage, a cutting-wire on the blade and a stop on the blade, spaced from the cutting-wire, as set forth.

7. A cutting device for cutting butter and like material contained in a receptacle of the shape of a frustum of a cone into parts of a predetermined weight, comprising a circular guideway adapted to be secured to the open end of the receptacle and having stops, spaced equidistant apart, a carriage mounted to travel on the said guideway and having means for stopping the carriage at any one of the stops, and a cutter on the said carriage, traveling with the same, for cutting the material into parallel rings, as set forth.

8. A cutting device for cutting butter and like material contained in a receptacle of the shape of a frustum of a cone into parts of a predetermined weight, comprising a circular guideway adapted to be secured to the open end of the receptacle and having stops, spaced equidistant apart, a carriage mounted to travel on the said guideway and having means for stopping the carriage at any one of the stops, and a cutter on the said carriage, traveling with the same, for cutting the material into parallel rings, the cutter consisting of a blade slidable in bearings on the carriage, a cutting-wire on the blade and a stop on the blade, spaced from the cutting-wire, as set forth.

9. A cutting device for cutting butter and like material contained in a receptacle of the shape of the frustum of a cone into parts of a predetermined weight, comprising a circular guideway adapted to be secured to the open end of the receptacle and having stops spaced equidistant apart, a carriage mounted to travel on the said guideway and having a handle, and a spring-pressed arm on the handle, adapted to engage the stops, as set forth.

10. A cutting device for cutting butter and like material contained in a receptacle of the shape of a frustum of a cone into parts of a predetermined weight, comprising a circular guideway adapted to be secured to the open end of the receptacle and having stops spaced equidistant apart, a carriage mounted to travel on the said guideway and having a handle, a spring-pressed arm on the handle, adapted to engage the stops, and a carrier fulcrumed on the carriage and having separate bearings disposed at angles one to the other, as set forth.

11. A cutting device for cutting butter and like material contained in a receptacle of the shape of a frustum of a cone into parts of a predetermined weight, comprising a circular guideway for attachment to the open end of the receptacle, a carriage mounted to travel on the said guideway, and a carrier pivoted on the carriage and having separate bearings at angles to each other, as set forth.

12. A cutting device for cutting butter and like material contained in a receptacle of the shape of a frustum of a cone into parts of a predetermined weight, comprising a circular guideway for attachment to the open end of the receptacle, a carriage mounted to travel on the said guideway, and a carrier pivoted on the carriage and having separate bearings at angles to each other, one of the bearings having parallel members and the other obliquely-disposed members, as set forth.

13. A cutter for butter and like material, comprising a cutting device, means for giving the cutting device a movement in a coniform path, and means for subdividing the material in the cone defined by the path of the cutting device, as set forth.

14. A cutter for butter and like material, comprising a cutting device, means for giving the cutting device a movement in a coniform path, means for subdividing the cone cut by the cutting device, and means for cutting the remainder of the material into rings exterior of the path described by the cutting device, as set forth.

15. A cutter for butter or like material contained in a receptacle, comprising means for cutting a cone center from the material in the receptacle, means for dividing the cone center into conical sections of a predetermined weight, and means for cutting the remainder of the material in the receptacle into rings, as set forth.

16. A cutter for butter and like material comprising a cutting device and means including a circular guideway for giving the said cutting device a movement in a coniform path as set forth.

17. A cutter for butter and like material comprising a cutting-blade and arranged as the side of a cone, supporting means connected with the base end of the cutting-blade and a circular guideway for the said supporting means to travel on to move the blade in a coniform path, as set forth.

In testimony whereof I have signed my name to this specification in the presence of two subscribing witnesses.

BAYARD HAMBLET.

Witnesses:
  THEO. G. HOSTER,
  EDWARD BOLTON MARSHALL.